US011245871B1

(12) United States Patent
Gandhi et al.

(10) Patent No.: US 11,245,871 B1
(45) Date of Patent: Feb. 8, 2022

(54) GESTURE-BASED WHITEBOARD

(71) Applicant: ServiceNow, Inc., Santa Clara, CA (US)

(72) Inventors: Bhairavi Gandhi, Hyderabad (IN); Prashant Upadhya, Andaman & Nicobar Islands (IN); Soumen Pal, Hyderabad (IN); Avishek Dey, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/140,984

(22) Filed: Jan. 4, 2021

(51) Int. Cl.
*H04N 7/15* (2006.01)
*G06F 3/14* (2006.01)
*H04N 5/272* (2006.01)
*G06K 9/00* (2022.01)

(52) U.S. Cl.
CPC ............ *H04N 7/15* (2013.01); *G06F 3/1454* (2013.01); *G06K 9/00355* (2013.01); *G06K 9/00711* (2013.01); *H04N 5/272* (2013.01)

(58) Field of Classification Search
CPC . H04N 7/15; H04N 5/272; G06F 3/14; G06K 9/00

USPC ............................ 348/14.01–14.16; 715/752
See application file for complete search history.

(56) References Cited

U.S. PATENT DOCUMENTS

| | | | | |
|---|---|---|---|---|
| 9,992,241 B1* | 6/2018 | Huang | ................ | H04M 7/0027 |
| 2013/0229333 A1* | 9/2013 | Schwartz | .............. | G06F 1/3246 345/156 |
| 2014/0250398 A1* | 9/2014 | Andrews | ............. | G06F 3/04883 715/771 |
| 2016/0098969 A1* | 4/2016 | Lee | ..................... | G06F 3/04883 345/156 |
| 2019/0260964 A1* | 8/2019 | Nagpal | ................. | H04L 65/403 |
| 2019/0325253 A1* | 10/2019 | Eikenes | ............. | H04L 12/1822 |
| 2020/0134788 A1* | 4/2020 | Benet Ballester | ...... | G06T 5/005 |

\* cited by examiner

*Primary Examiner* — Melur Ramakrishnaiah
(74) *Attorney, Agent, or Firm* — Van Pelt, Yi & James LLP

(57) ABSTRACT

A video of a user is received. An image of the video is analyzed to identify a marking object in the image with a color value within a first range. A location associated with the marking object is marked. The marked location is provided to one or more other users via a collaboration medium.

20 Claims, 10 Drawing Sheets

US 11,245,871 B1

GESTURE-BASED WHITEBOARD

BACKGROUND OF THE INVENTION

Video conferencing allows users to collaborate from different physical locations. Typically, video conferencing involves sharing video feeds that include both an image feed and an audio feed. The sharing of video feeds mimics meeting other users in person. With multi-party video conferences, each user's video feed can be shared with multiple other users to mimic a large in-person group meeting. In some scenarios, users can also share documents over a video conference. For example, a presenter can share slides from a slide show presentation while voicing the audio portion of the presentation. Other users of the video conference observe the presenter by receiving the voice presentation along with the images of the slide show.

BRIEF DESCRIPTION OF THE DRAWINGS

Various embodiments of the invention are disclosed in the following detailed description and the accompanying drawings.

DETAILED DESCRIPTION

Figure 1:
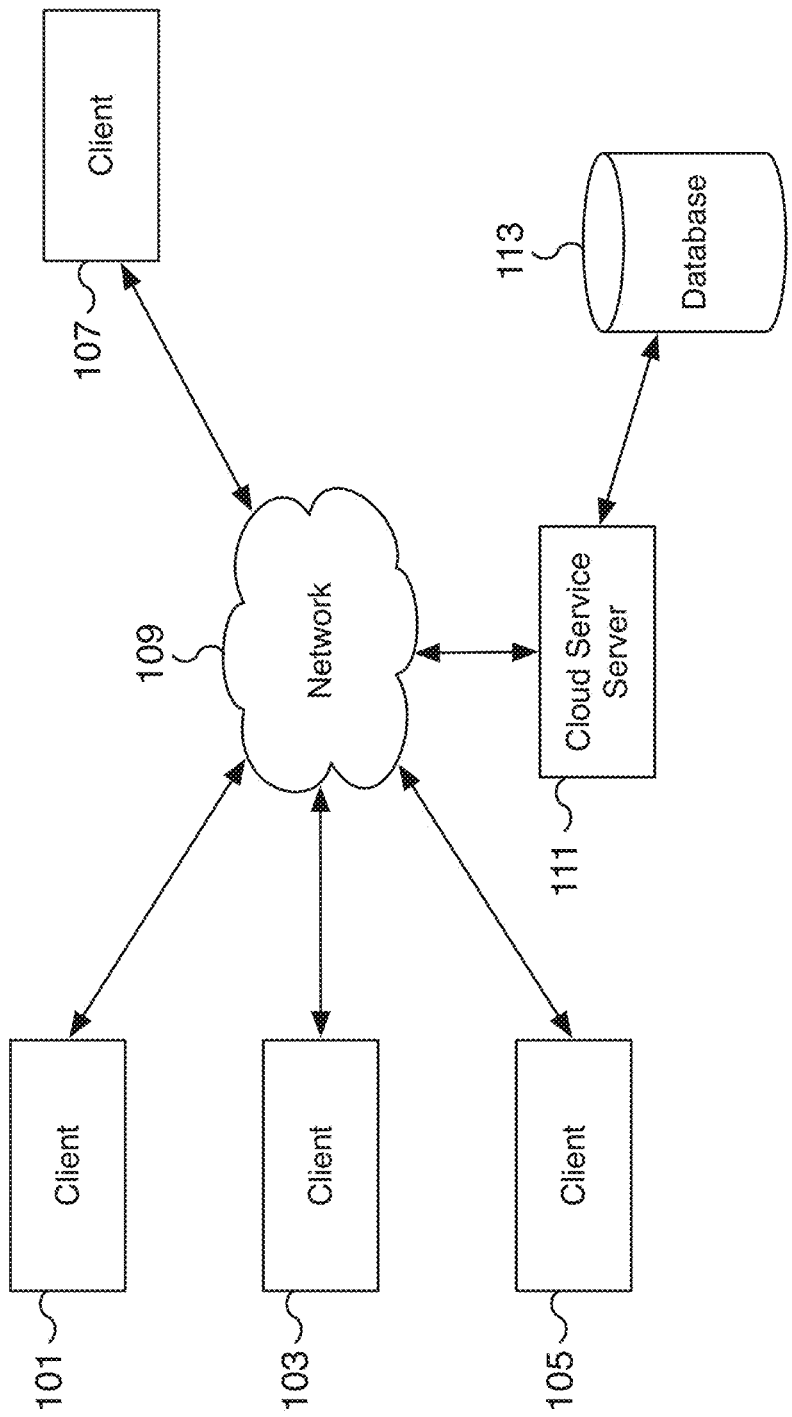
FIG. 1 is a block diagram illustrating an example of a network environment for a collaborative virtual whiteboard.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A gesture-based collaborative whiteboard is disclosed. Using the disclosed techniques, users connected over a video-based online meeting can collaborate over a virtual shared whiteboard. A user that wishes to draw on the whiteboard simply gestures using a marking object. The gestures are translated into drawings on the virtual whiteboard that are shared with other users. Any of the users can collaborate by adding to, modifying, erasing, or otherwise changing the contents of the whiteboard using corresponding gestures tied to different marking objects. For example, a user can select a blue-tipped marker as a marking object. To draw a circle on a virtual whiteboard, the user gestures with a circular motion using the blue-tipped marker in front of the video camera capturing the video meeting. The gestures made with the tip of the blue-tipped marker are tracked and converted to a drawn object on the virtual whiteboard. The contents of the whiteboard are continuously updated and shared with other collaborators. Other marking objects can be used as well and can be configured by their unique colors. In some embodiments, the marking objects are also configured by their shapes and/or sizes. For example, instead of a blue-tipped marker, a circular red marble can be used as a marking object to draw on the virtual whiteboard. When no configured marking object is within view of the camera or the user has indicated that marking gestures should be ignored, the whiteboard is not modified, and the user's gestures are not tracked for modifying the contents of the whiteboard. In some embodiments, a user can indicate that marking gestures should be ignored by presenting a pause action marking object and/or by using a dedicated pause action hand gesture such as holding up the palm of one's hand to face the video camera.

The marking objects recognized by the whiteboard system are not limited to drawing objects but also include other whiteboard objects such as erasing objects. In some embodiments, the virtual whiteboard can be configured to recognize a different color as an erasing object that performs erase actions. For example, a yellow-tipped marker can be configured as an erasing object for interacting with the virtual whiteboard. In some embodiments, the erasing object is also configured by shape and/or size. When a whiteboard is shared, the drawings of the virtual whiteboard are displayed for each user, such as on their video screen or monitor. By gesturing with the yellow-tipped marker as a virtual eraser, a user can erase and modify the existing drawings on the virtual whiteboard. As portions are erased, the contents of the whiteboard are modified, and the updates are shared. In some embodiments, the whiteboard gestures are captured and mirrored prior to being displayed to the users. This allows all users to see the corresponding drawings from the perspective of the drawer. In various embodiments, the whiteboard drawings are transmitted via a cloud service. Users can connect to the cloud service to join the collaborative whiteboard meeting and download different saved versions of the whiteboard both during and after the meeting has concluded.

In some embodiments, a video of a user is received. For example, the video is captured from a camera such as a webcam of a laptop, desktop computer, mobile device, tablet, kiosk, or other computing device. An image of the video is analyzed to identify a marking object in the image with a color value within a first range. For example, a marking object, such as a blue-tipped marker, is configured using a specific color value, in this case the blue color of the blue tip. In some embodiments, the color value is associated with a specified threshold range or a default threshold range value can be used. Images extracted from the video are analyzed to identify the marking object by at least in part identifying pixels within a range of the configured color value. For example, when a blue-tipped marker is configured as the marking object, the image is then analyzed to identify the pixels that are within the range of the blue color of the blue-tipped marker. In some embodiments, the matching colored pixels are then further analyzed to identify a shape and/or size corresponding to the configured marking object, such as the marker's blue tip. In some embodiments, a location associated with the marking object is marked. For example, a relative x and y location on a 2-dimensional plane is associated with the identified marking object. This 2-dimensional plane can correspond to the virtual whiteboard that the user virtually draws on using the configured marking object. In some embodiments, the marked location is provided to one or more other users via a collaboration medium. For example, the location of the marking object is translated to a whiteboard action such as drawing or erasing and shared with other users over a virtual collaborative whiteboard. A sequence of tracked locations can correspond to a line, curve, or another shape that is shared with other users.

FIG. 1 is a block diagram illustrating an example of a network environment for a collaborative virtual whiteboard. In the example shown, clients 101, 103, 105, and 107 and cloud service server 111 are communicatively connected via network 109. Network 109 can be a public or private network. In some embodiments, network 109 is a public network such as the Internet. In some embodiments, clients 101, 103, 105, and 107 are on a private local network separate of cloud service server 111. In the example shown, cloud service server 111 is communicatively connected to database 113. Cloud service server 111 and database 113 may be on the same network and/or hosted in the same datacenter or connected via another topology than the one shown. In various embodiments, cloud service server 111 utilizing database 113 hosts cloud services such as online video conferences that support collaborative virtual whiteboards. In some embodiments, cloud service server 111 hosts configuration management database (CMDB) services. Additional services provided by cloud service server 111 can include resource discovery, resource management, event management, cloud management, maintenance, and compliance services, among others. In the various scenarios, database 113 can be utilized to store data related to the cloud hosted services offered by cloud service server 111.

In some embodiments, clients 101, 103, 105, and 107 are example client systems used to connect different users with one another in pair or group online video conferences. Clients 101, 103, 105, and 107 may have different software/hardware configurations but each generally includes video conferencing equipment such as a video camera and a display. Clients 101, 103, 105, and 107 can include laptops, desktop computers, mobile devices, tablets, kiosks, smart televisions, or other appropriate computing devices for video conferencing. In various embodiments, the configurations of the different client machines are cataloged using cloud service server 111 with a service such as a CMDB service. The resources available for each client machine and its associated properties can be stored in a database such as database 113. In some embodiments, the information is stored in a CMDB database.

In various embodiments, clients 101, 103, 105, and 107 connect to one another using a video conference and whiteboard platform via cloud service server 111. For example, cloud service server 111 hosts a video conference platform that supports collaborative virtual whiteboards and operates as a central host for managing online meetings and collaborative virtual whiteboards. Cloud service server 111 can help negotiate the connections to establish the initial online conference as well as ensure the virtual whiteboard is synchronized across all users. In some embodiments, updates to a virtual whiteboard are first transmitted from a client to cloud service server 111 before cloud service server 111 distributes the updates to other clients. In some embodiments, cloud service server 111 can also make accessible saved versions of whiteboards created during online meetings. The different versions can be made available for downloading, viewing, modifying, sharing, and/or loading into a new online meeting, among other actions even after the initial meeting where the whiteboard was first created has completed.

In some embodiments, database 113 is utilized by cloud service server 111 to store information related to clients 101, 103, 105, and 107. In some embodiments, database 113 is a CMDB database. For example, database 113 can be used to store resource discovery information as part of a CMDB service for managing client resources. Although database 113 is shown connected to cloud service server 111, database 113 may be located in a variety of network locations as appropriate. For example, database 113 may be located external to a local network that includes clients 101, 103, 105, and 107. In some embodiments, database 113 is not directly connected to cloud service server 111 but only communicatively connected to cloud service server 111. Database 113 may also be used to store different saved versions of collaborative whiteboards and their contents, resource information of clients with access to whiteboards, hardware/software capabilities of clients such as clients 101, 103, 105, and 107, and/or hardware/software configurations of clients such as clients 101, 103, 105, and 107 including collaborate whiteboard configuration settings. For example, database 113 can be used to store information related to an online video conference where a collaborative whiteboard was used. The session information can include the users that participated in the meeting, user profile information for the different participants, the whiteboard configuration settings including each user's as well as general whiteboard settings, updates each user made to the whiteboard, access privileges for view, modify, and/or save the contents of the whiteboard, user comments made and/or attached to the whiteboard, and access to view and/or modify saved versions of the whiteboard, among other information. In some embodiments, database 113 is a cloud-based database server and may be part of and/or collocated with cloud service server 111.

Although the video conference and virtual whiteboard system of FIG. 1 is shown utilizing cloud service server 111, in some embodiments, clients 101, 103, 105, and 107 can utilize a peer-to-peer system for hosting the online meeting and shared whiteboard. In the event a peer-to-peer model is utilized, portions of the functionalities of cloud service server 111 and database 113 can be merged into clients 101, 103, 105, and 107. In some embodiments, cloud service server 111 can still be utilized when a partial or full peer-to-peer model is utilized. For example, cloud service server 111 can be utilized for initial meeting setup and/or hosting saved whiteboards for access after meetings have concluded.

Although single instances of some components have been shown to simplify the diagram of FIG. 1, additional instances of any of the components shown in FIG. 1 may also exist. For example, cloud service server 111 may include one or more different servers and/or multiple distributed components. Similarly, database 113 may include one or more database servers and may not be directly connected to cloud service server 111. For example, database 113 and its components may be replicated and/or distributed across multiple servers, components, and/or locations. In some embodiments, components not shown in FIG. 1 may also exist.

Figure 2:
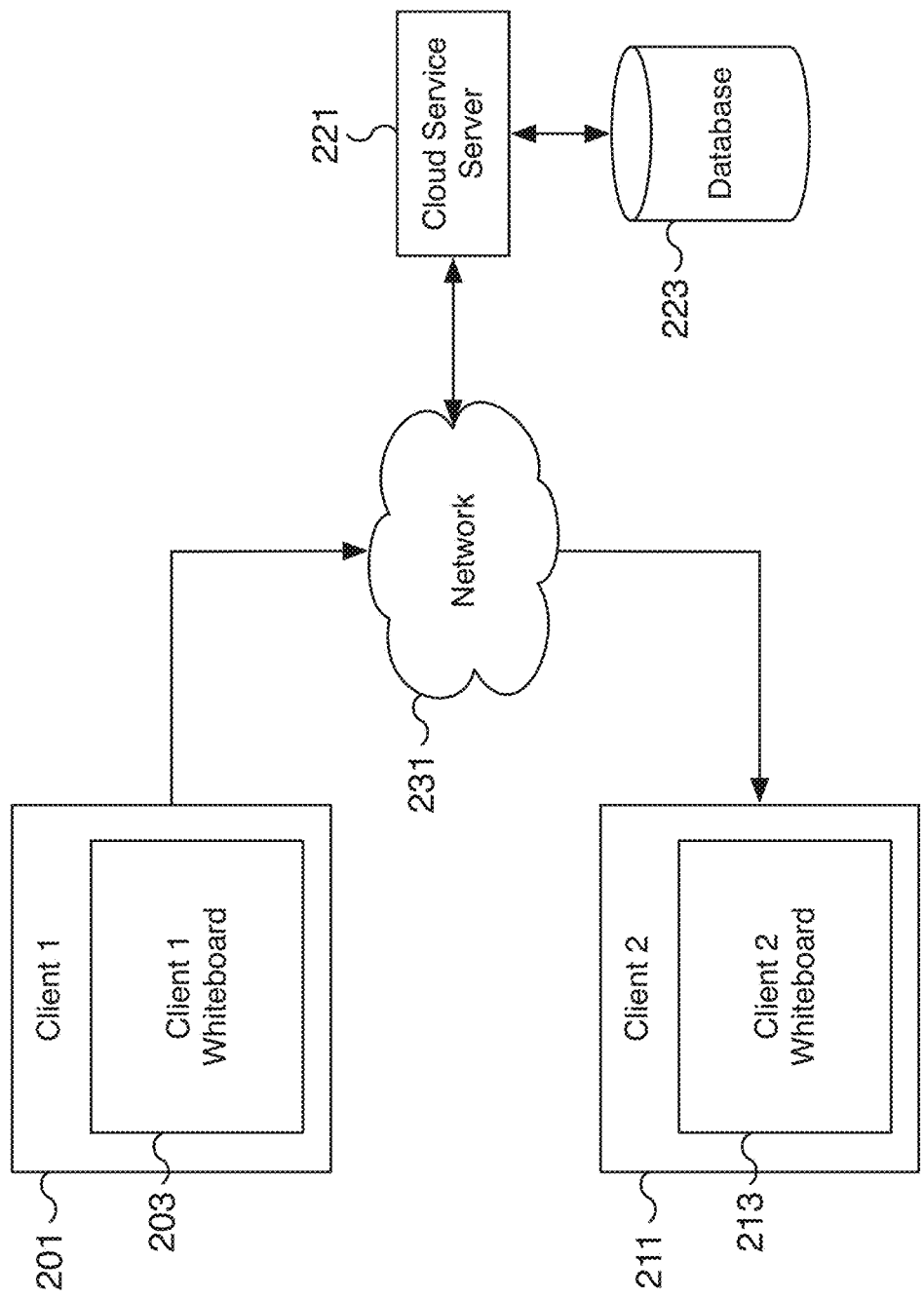
FIG. 2 is a block diagram illustrating an example of a communication environment for a collaborative virtual whiteboard shared between two users.

FIG. 2 is a block diagram illustrating an example of a communication environment for a collaborative virtual whiteboard shared between two users. In the example shown, clients 201 and 211 collaborate on a virtual shared whiteboard. Each user sees and interacts with its own instance of the collaborative virtual whiteboard. Client 201 includes whiteboard 203 and client 211 includes whiteboard 213. Whiteboards 203 and 213 are client instances representing the same collaborative virtual whiteboard which is synchronized by cloud service server 221. Clients 201 and 211 and cloud service server 221 are communicatively connected via network 231. Database 223 is communicatively connected to cloud service server 221 and is utilized at least in part to help synchronize whiteboards 203 and 213. In some embodiments, clients 201 and 211 are any two of clients 101, 103, 105, and 107 of FIG. 1, network 231 is network 109 of FIG. 1, cloud service server 221 is cloud service server 111 of FIG. 1, and database 223 is database 113 of FIG. 1. Although shown with only two clients, the communication environment can be extended to multiple clients in a group meeting setting.

In the example shown, the arrows of the connections between the different components of FIG. 2 demonstrate the network flow of a whiteboard update made by client 201 to the virtual whiteboard shared by clients 201 and 211. In response to an update made by client 201, the whiteboard update is transmitted from client 201 to cloud service server 221 and then transmitted to client 211. The update synchronizes whiteboard 213 utilized by client 211 to correspond to whiteboard 203 utilized by client 201. Although not shown in FIG. 2, the same process can be performed in reserve to share updates made by client 211 with client 201.

In some embodiments, client service server 221 and database 223 are utilized to synchronize and manage whiteboard updates. In response to an update, cloud service server 221 can retrieve and store information in database 223, such as storing an update record associated with a whiteboard update and accessing client information such as which clients should receive the update. For example, the user at client 201 gestures to draw a new object on whiteboard 203. The whiteboard update is transmitted through network 231 to cloud service server 221. Cloud service server 221 can save the update and/or a record of the update in database 223. Cloud service server 221 can also retrieve information from database 223 such as which users have access to the update, which users need to receive the update, and how to contact the intended users, such as client 211. Cloud service server 221 can also retrieve information from database 223 such as the software configuration utilized by client 211. For example, in some embodiments, cloud service server 221 translates the whiteboard update from a version utilized by client 201 to one compatible with client 211. Once cloud service server 221 determines that client 211 needs the whiteboard update, cloud service server 221 transmits the whiteboard update to client 211 via network 231. In various embodiments, a transmitted whiteboard update can include the entire contents of the whiteboard or can be an incremental update that describes changes since a previous saved state of the whiteboard.

Figure 3:
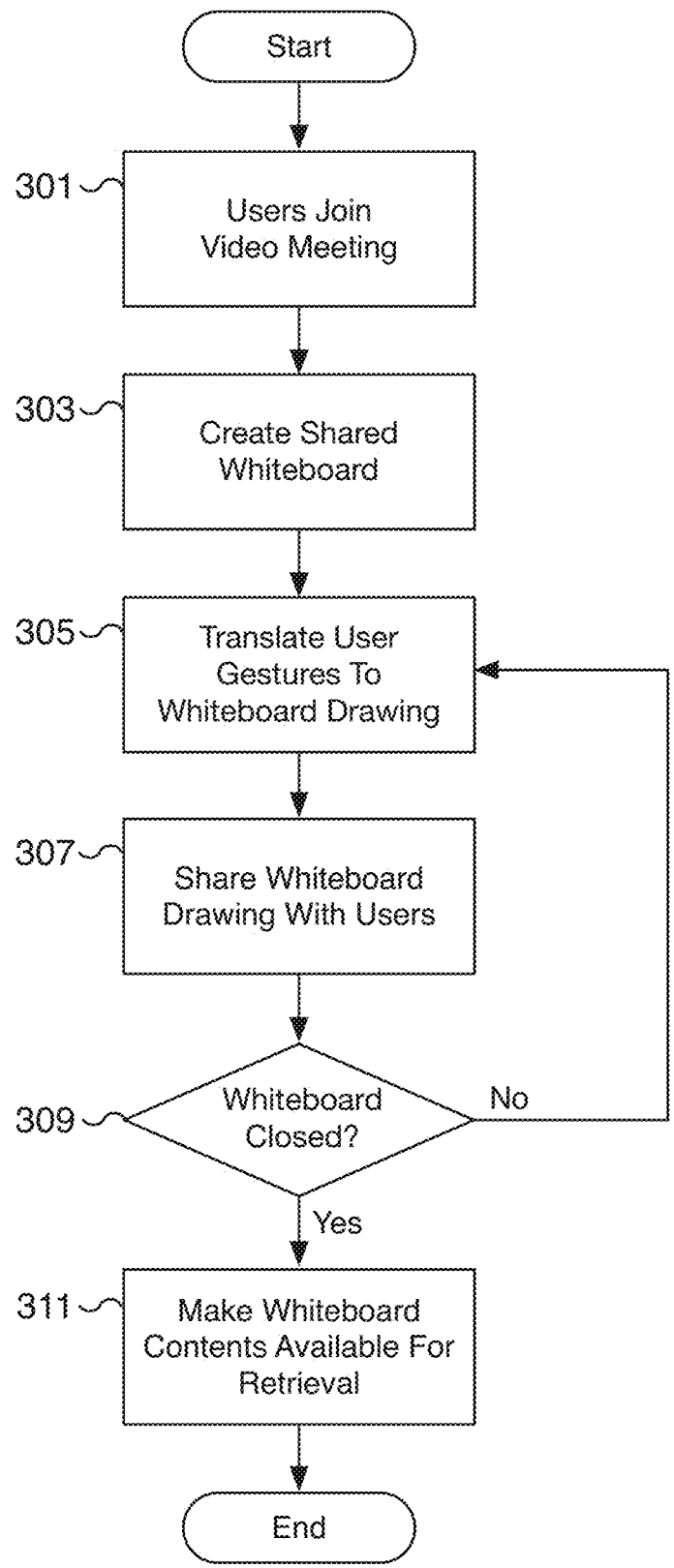
FIG. 3 is a flow chart illustrating an embodiment of a process for collaborating using a virtual shared whiteboard.

FIG. 3 is a flow chart illustrating an embodiment of a process for collaborating using a virtual shared whiteboard. In various embodiments, the process of FIG. 3 is performed using a video conference and whiteboard platform. For example, clients connect to one another using a cloud service to initiate a video conference meeting where they can collaborate using a virtual whiteboard. Users can gesture using marking objects to modify the contents of the shared whiteboard. The gestures are captured by their respective video cameras and converted to whiteboard actions. In some embodiments, the clients are any pair or grouping of clients 101, 103, 105, and 107 of FIG. 1 and the cloud service is offered by cloud service server 111 of FIG. 1.

At 301, users join a video meeting. For example, users join a video conference meeting using a cloud hosted service. The cloud hosted service can allow a user to start and invite other users into the meeting. The cloud hosted service can also store and retrieve user settings including software and hardware configurations. In some embodiments, the cloud service also stores whiteboard configuration settings, such as configuration settings for access privileges and configured marking objects. For example, a first user can configure a blue-tipped marker for drawing and a yellow-tipped marker for erasing whereas a second user can configure a red marble for drawing and a green-capped highlighter for erasing. The configuration settings can be carried over across different online meetings.

At 303, a virtual shared whiteboard is created. For example, a first user configures and creates a virtual shared whiteboard. The user can invite and/or grant other users access to the whiteboard. In some embodiments, each user can have a variety of access privileges associated with the virtual shared whiteboard, including read, write, save, share, and comment privileges, among others. For example, in various embodiments, a read privilege allows a user to view the whiteboard but on its own does not allow a user to not make any edits to the whiteboard's contents. A write (or modify) privilege allows a user to make changes to the whiteboard's contents. Different save privileges allow different levels of access for a user to save the whiteboard's contents and direct the saved copy to a specific location such as the user's own computer hardware or to network locations such as a cloud hosted location. In some embodiments, different share privileges allow a user to share the whiteboard's contents and/or share access to joining the collaborative virtual whiteboard. In some embodiments, users are granted permissions to comment on the whiteboard's contents. The comments are distinct from the whiteboard drawing and can be used, for example, to create a running dialogue between users as they comment on the whiteboard drawing and changes to the drawing. In some embodiments, the virtual shared whiteboard is created using an existing whiteboard. For example, the contents of a previous meeting's whiteboard are carried over into the whiteboard created for the current video meeting. A project that takes place over several sessions can utilize the same whiteboard by carrying over progress made from each meeting session and retaining a history of changes made over the past sessions.

In some embodiments, the virtual shared whiteboard is automatically created. For example, by analyzing the users and the session context, a virtual shared whiteboard is automatically created for collaboration between users of the meeting. The contents of the whiteboard can also be automatically loaded using the previous state of the whiteboard from a previous session. For example, the video meeting can be identified and marked as a continuation of a previous meeting and a virtual shared whiteboard is automatically created using the state of the whiteboard from the conclusion of the previous meeting. In some embodiments, updates can be added by users between the two meetings and the updated version of the whiteboard is loaded. In various embodiments, whiteboard configuration settings are also automatically loaded to maintain the same configuration settings from previous sessions.

At 305, user gestures are translated to a whiteboard drawing. For example, when a user initiates drawing on the virtual whiteboard, the user's gestures are tracked and translated to a whiteboard drawing. In some embodiments, the user's gestures are made while using a marking object similar to a virtual pen or virtual eraser. When drawing, the gestures can be recognized as drawing features that are added to the whiteboard drawing. When erasing, the gestures can be recognized as erasing features that are used to erase or modify the contents of the whiteboard drawing. In various embodiments, the whiteboard drawing is updated by translating gestures performed by each user to whiteboard actions to perform on the virtual whiteboard. For example, a first user can perform drawing gestures corresponding to drawing a flow diagram while a second user can perform gestures corresponding to highlighting and labeling portions of the same flow diagram. A third user can make edits to the flow diagram, for example, by performing erasing and drawing gestures to erase a second step of the flow diagram and replace it with a conditional branch. In various embodiments, each user makes the changes by performing gestures using their own corresponding marking objects. In some embodiments, the user gestures that modify the whiteboard drawing are captured by a video camera and are mirrored when translated to a whiteboard drawing. The mirroring allows the captured drawing to reflect the view of the user performing the gestures, which can be a different perspective than the user's video camera.

At 307, the whiteboard drawing is shared with users of the meeting. For example, as whiteboard updates are made by each user, the updates are shared to other members of the video meeting to keep the whiteboard contents synchronized. For a three-person video meeting, edits made by a first user are shared with the second and third users, edits made by a second user are shared with the first and third users, and edits made by the third user are shared with the first and second users. In some embodiments, the whiteboard updates are passed through a cloud service and the cloud service helps to distribute edits to other users in the video meeting.

At 309, a determination is made whether the whiteboard is closed. In the event the whiteboard is closed, processing proceeds to 311. In the event the whiteboard is not closed, processing loops back to 305 to translate additional user gestures into additional whiteboard drawings. In various embodiments, when users no longer need the whiteboard, the whiteboard can be closed. In some embodiments, the whiteboard is closed automatically when the video meeting is finished.

At 311, the whiteboard contents are made available for retrieval. For example, the video meeting has ended, and a state of the whiteboard is saved. The saved contents can be made available for retrieval. For example, users can download the contents, share the contents, and/or use the contents as a basis for the start of a virtual shared whiteboard for another meeting. For example, for a follow up meeting, the whiteboard drawing can be retrieved and loaded into the whiteboard of the new meeting. Actions performed on the whiteboard can be carried over and no work history is lost. In some embodiments, comments attached to the whiteboard are also made available for retrieval. For example, a chain of comments made by users during the video meeting is saved and is made available for retrieval. In various embodiments, the contents of the whiteboard include not only the drawings made to the whiteboard but also the history of actions and/or changes made to the whiteboard, comments attached to the whiteboard, usage information including information related to which users had access to the whiteboard and the type of access, and other related metadata of the whiteboard.

Figure 4:
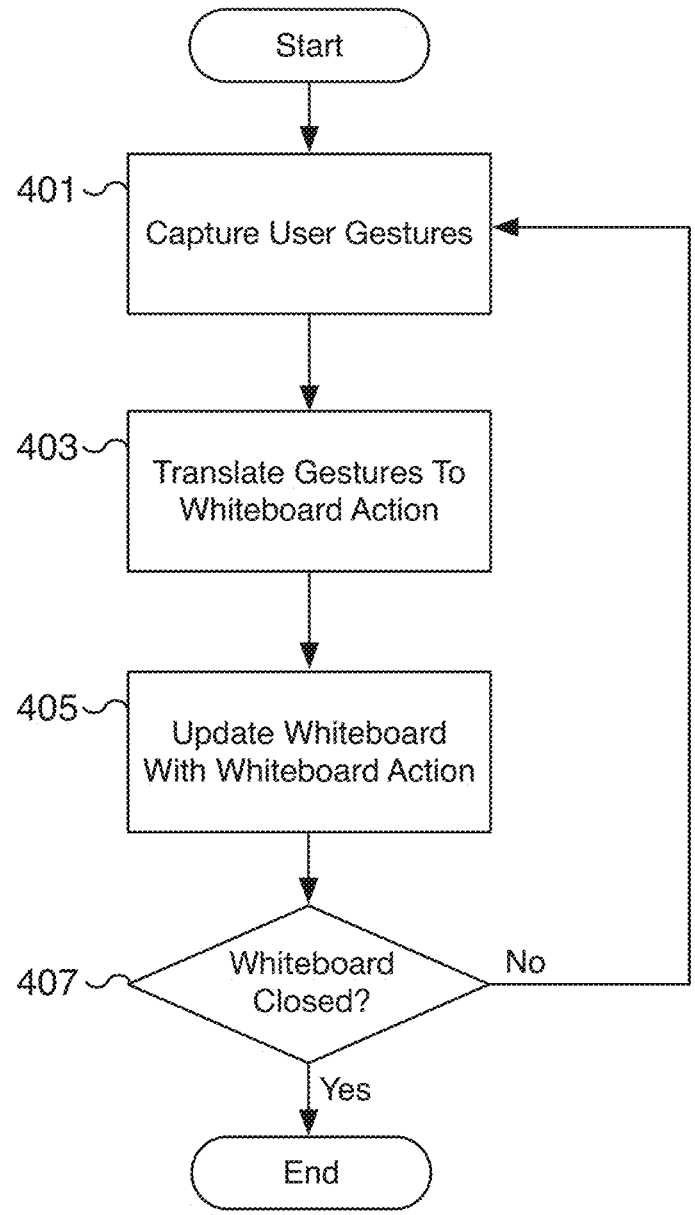
FIG. 4 is a flow chart illustrating an embodiment of a process for interacting with a virtual shared whiteboard using gestures.

FIG. 4 is a flow chart illustrating an embodiment of a process for interacting with a virtual shared whiteboard using gestures. In various embodiments, the process of FIG. 4 is performed by a user utilizing a virtual shared whiteboard via a video conference platform. For example, a user in a video meeting creates a shared whiteboard. Using gestures, the user can interact with the virtual whiteboard such as modifying the contents on the whiteboard and sharing the changes with other users in the same video meeting. Using gestures, the user can also control the operation of the whiteboard such as zooming in, panning, saving the contents of the whiteboard, starting, pausing, and stopping editing, and inviting other users to collaborate using the whiteboard, among others. In some embodiments, with respect to certain actions, the process of FIG. 4 is performed at 305 of FIG. 3 for updating a whiteboard drawing. In various embodiments, the users of the meeting correspond to any pair or grouping of clients 101, 103, 105, and 107 of FIG. 1. In some embodiments, the video meeting can be hosted via a cloud service that is offered by cloud service server 111 of FIG. 1.

At 401, user gestures are captured. For example, a user performs gestures that are captured using a video camera, such as the video camera used for a video conference meeting. The gestures are directed to a virtual whiteboard and can include changes to the drawing of the whiteboard and changes to the overall operation of the virtual whiteboard. In some embodiments, the user interacts with a two-dimensional plane in front of the video camera (or display) and the corresponding actions are updated in a displayed whiteboard shown on the user's display. For example, by performing gestures a user can perform drawing and erasing actions corresponding to drawing and erasing portions of the contents of the whiteboard, respectively. In some embodiments, the user can also perform gestures corresponding to copy, paste, duplicate, zoom, pan, crop, and other editing actions. In various embodiments, the gestures can be performed by utilizing a marking object, such as a pen, marker, highlighter, ball, or another object such as a commonly found desktop object. Each of the marking objects can be configured as different marking objects to perform different actions or sets of actions by its color. In some embodiments, a color threshold range is also configured. Similarly, in some embodiments, a shape and/or size of the marking object is configured. Additional gestures can be performed such as actions corresponding to start/pause/stop edit mode actions, save actions, share actions, and invite actions, among others. For example, a user can use an open palm or a first gesture to pause editing of the whiteboard. A different gesture can be used to initiate a start action to start the tracking of draw gestures. Another different gesture can be used to save the current state of the whiteboard using a specified name.

At 403, gestures are translated to a whiteboard action. For example, a draw gesture is translated into a whiteboard draw action. Similarly, an erase action is translated to an erase action. In various embodiments, in the event a marking object is utilized when performing the gesture, the action type can be determined based on the marking object. For example, gestures made using a drawing marking object are translated to whiteboard draw actions. Similarly, gestures made using an erasing marking object are translated to whiteboard erase actions. Other marking objects can include selection marking objects and highlighting marking objects. In some embodiments, gestures do not require a marking object and are translated to corresponding whiteboard actions. For example, an open palm or a first gesture can be translated into a whiteboard action to pause editing. Once editing is paused, the user can hold a drawing object without drawing to the whiteboard. In some embodiments, additional gestures can be translated to additional actions such as copy, paste, duplicate, zoom, pan, crop, save, share, and invite actions, among others.

In various embodiments, some actions such as draw actions include identifying a modification to the whiteboard contents. For example, a draw action includes identifying a corresponding drawing feature such as a line, shape, curve, dot, or other drawing. Similarly, an erase action can include identifying a corresponding erase feature such as a closed region of the whiteboard to which an erase action is applied.

At 405, the whiteboard is updated with a whiteboard action. For example, the action determined at 403 is applied to the current whiteboard. The action can be a draw action which results in updating the contents of the whiteboard with a newly drawn drawing feature such as a line, shape, curve, dots, or other drawing feature determined by a user's gestures. As another example, the action can be an erase action and results in erasing a portion of the whiteboard contents. As yet another example, a highlight action can overlay highlights similar to a highlighter on the intended portions of the whiteboard contents. In some embodiments, the actions do not all directly change the whiteboard contents. For example, a save action can save the contents of the whiteboard to a cloud storage. As another example, a share action can email a copy of the whiteboard contents to one or more users of the meeting. Other actions can be applied as well such as copy, paste, duplicate, zoom, pan, crop, and invite actions, among others.

At 407, a determination is made whether the whiteboard is closed. In the event the whiteboard is closed, processing ends. In the event the whiteboard is not closed, processing loops back to 401 to capture and translate additional user gestures.

Figure 5:
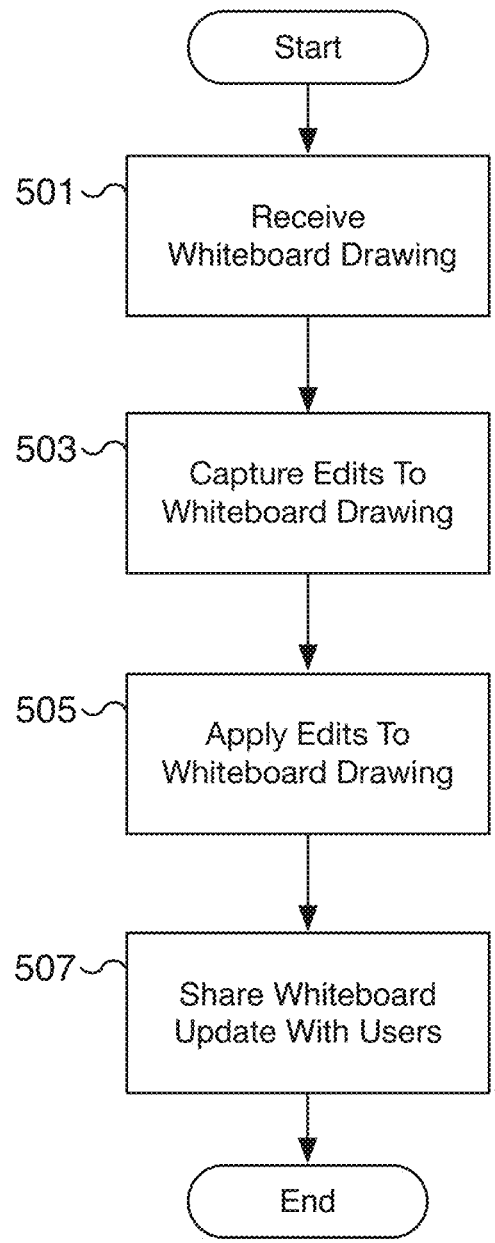
FIG. 5 is a flow chart illustrating an embodiment of a process for collaborating with other users using a gesture-based virtual shared whiteboard.

FIG. 5 is a flow chart illustrating an embodiment of a process for collaborating with other users using a gesture-based virtual shared whiteboard. In various embodiments, the process of FIG. 5 is performed by a user invited to collaborate using a virtual shared whiteboard via a video conference platform. For example, a user in a video meeting receives an invitation to a shared whiteboard. Using gestures, the user modifies the contents on the whiteboard and the changes are shared to other users also viewing the whiteboard in the same video meeting. In various embodiments, the process of FIG. 5 is performed whenever a user wants to update the shared whiteboard. For example, the process can be performed in a loop as long as the whiteboard is accessible to the user. In some embodiments, the process of FIG. 5 is performed at 305 and/or 307 of FIG. 3. In various embodiments, the users of the meeting correspond to any pair or grouping of clients 101, 103, 105, and 107 of FIG. 1. In some embodiments, the video meeting can be hosted via a cloud service that is offered by cloud service server 111 of FIG. 1.

At 501, a whiteboard drawing is received. For example, a whiteboard and its contents are received. In some embodiments, the whiteboard is displayed on a user's monitor or screen. In various embodiments, the initial whiteboard drawing can be a blank drawing or may be pre-loaded with an initial image. As the contents are updated by other users, the contents of the whiteboard are also updated. In some embodiments, the updates from other users are received via a cloud server that distributes updates to users of the meeting.

At 503, edits to a whiteboard drawing are captured. For example, a user performs gestures that are translated into whiteboard actions. The actions can correspond to updates to the whiteboard such as a user drawing or virtually sketching additional steps for a flow chart. Additional actions can include an erase action to erase a portion of an existing flow chart or a highlight action to highlight a selected portion of the whiteboard.

At 505, edits to a whiteboard drawing are applied. For example, the edits captured at 503 are applied to the whiteboard drawing. Depending on the actions, additional drawing features, such as shapes, lines, dots, curves, etc. are added to the drawing and/or portions of the drawing are erased. Similarly, portions of the whiteboard can be highlighted, copied, duplicated, and cropped, among other actions. In various embodiments, the edits are first applied to the whiteboard drawing local to the user. For example, the edits are first applied locally and then shared to other users.

At 507, a whiteboard update is shared with users. For example, the updated edits applied locally are shared with other users of the video meeting that are collaborating on the same shared whiteboard. In some embodiments, the updates are sent as incremental updates that are applied to an existing whiteboard state. The whiteboard state may be tracked by a central service and/or by each users of the share whiteboard. In some embodiments, the entire whiteboard is transmitted, for example, the entire contents of the whiteboard are transmitted as an image instead of as incremental updates or edits.

Figure 6:
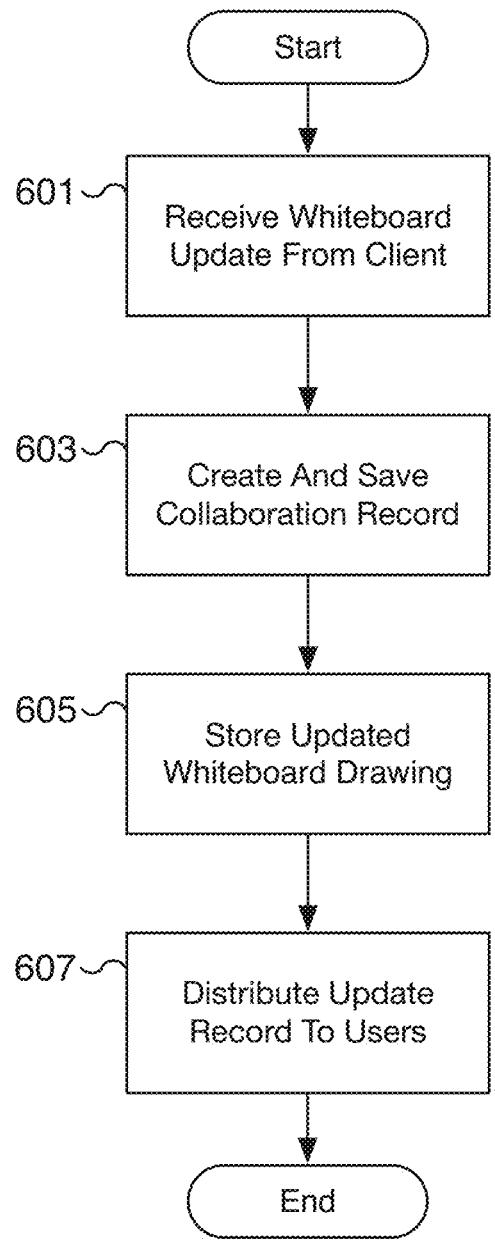
FIG. 6 is a flow chart illustrating an embodiment of a process for synchronizing a gesture-based virtual shared whiteboard.

FIG. 6 is a flow chart illustrating an embodiment of a process for synchronizing a gesture-based virtual shared whiteboard. In various embodiments, the process of FIG. 6 is performed by a cloud server to synchronize the contents of a shared whiteboard between all users using the shared whiteboard during a video meeting. For example, when one user makes a modification to the whiteboard, the cloud service receives and distributes the update to the other users. In some embodiments, the cloud service can also track the updates and store the incremental updates, for example, to preserve a history of modifications to the whiteboard. In some embodiments, the process of FIG. 6 is performed by cloud service server 111 of FIG. 1 whenever a user makes an update to the shared whiteboard. In some embodiments, the process of FIG. 6 is performed at 307 of FIG. 3. In various embodiments, the users of the video meeting correspond to any pair or grouping of clients 101, 103, 105, and 107 of FIG. 1. In some embodiments, the video meeting can be hosted via a cloud service that is offered by cloud service server 111 of FIG. 1.

At 601, a whiteboard update is received from a client. For example, in response to an update to a virtual shared whiteboard from a user, a whiteboard update is transmitted to a cloud server where it is received at 601. The update can correspond to a draw action, an erase action, or another whiteboard action. In various embodiments, the update received includes metadata such as information associated with the user that made the update, the time associated with the update, and the type and context of the update.

At 603, a collaboration record is created and saved. For example, a collaboration record is created to reflect the whiteboard update received at 601 and saved. In some embodiments, the update is a database record and is stored in a database such as database 113 of FIG. 1. In various embodiments, the collaboration record can be used in conjunction with other collaboration records to track the history of modifications to the virtual whiteboard. The collaboration record can include metadata associated with edits such as the user who requested the update, the time associated with the update, the type of update, and the context of the update, among other information.

At 605, the updated whiteboard drawing is stored. In various embodiments, the whiteboard drawing is stored, for example, in a datastore such as database 113 of FIG. 1. The whiteboard drawing can correspond to a two-dimensional rendering of the whiteboard and can be made available for sharing. For example, the whiteboard drawing can be made available for users to download as an image or another appropriate file format. In some embodiments, the whiteboard drawing is more than an image of the whiteboard drawing and includes the actions applied to the whiteboard along with other context. Users who download the whiteboard drawing can replay the modifications, add additional updates to the drawing such as drawing new features, and/or delete portions of the drawing.

At 607, an update record is distributed to users. For example, the whiteboard update is distributed to all users that are collaborating on the virtual whiteboard. In some embodiments, the users each receive an incremental update and can apply the incremental update to their corresponding existing whiteboards. In some embodiments, the users can receive the full whiteboard contents and are not required to apply an incremental update. For example, the users can receive the most current image of the full whiteboard drawing. In various embodiments, all users participating in the corresponding video conference receive the update and are able to stay synchronized with one another.

Figure 7:
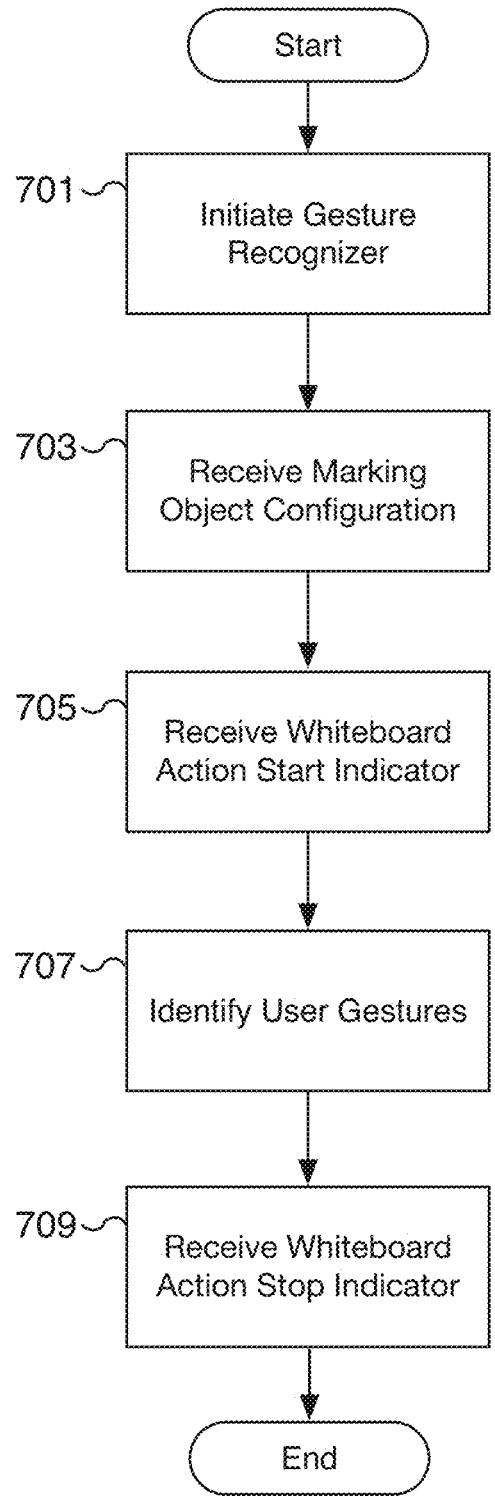
FIG. 7 is a flow chart illustrating an embodiment of a process for interacting with a virtual shared whiteboard using gestures and marking objects.

FIG. 7 is a flow chart illustrating an embodiment of a process for interacting with a virtual shared whiteboard using gestures and marking objects. For example, while holding a marking object, a user performs a gesture that is recognized as a whiteboard action. The whiteboard action can correspond to drawing on the whiteboard, erasing from the whiteboard, highlighting portions of the whiteboard, or another appropriate whiteboard action. The whiteboard action can be applied to the virtual whiteboard and shared with other users in a video meeting. In some embodiments, the process of FIG. 7 is performed at least in part at 305 of FIG. 3 for updating a whiteboard drawing. In some embodiments, the process of FIG. 7 is performed repeatedly, such as in a loop, as long as a user has access to modify a shared whiteboard. In various embodiments, the users of the meeting correspond to any pair or grouping of clients 101, 103, 105, and 107 of FIG. 1. In some embodiments, the video meeting can be hosted via a cloud service that is offered by cloud service server 111 of FIG. 1.

At 701, a gesture recognizer is initiated. For example, a gesture recognizer module of the client is initialized. The module can be initialized in response to creating and/or joining a virtual shared whiteboard. In various embodiments, the gesture recognizer requires access to a video camera and a corresponding video camera feed or captured video images. In some embodiments, the gesture recognizer is initiated as part of a cloud hosted video meeting software service.

At 703, a marking object configuration is received. For example, one or more marking objects are configured for recognizing gestures. In some embodiments, multiple marking objects are configured. Each marking object can be configured by identifying a specific color of the object. For example, the blue tip of a blue-tipped marker is used to configure the color of the corresponding marker. In various embodiments, the color configuration can be configured by showing or presenting the corresponding marking object to the video camera. For example, the user holds the blue-tip of a blue-tipped marker up to a web camera. In some embodiments, the user then selects the marker tip from the captured video image, making sure the selected region only includes the blue tip. In various embodiments, a color value or threshold range is specified as well. Any color within a specified (or default) range of the identified color can be considered as a potential match to the blue tip of the marker. In some embodiments, a shape or size of the marking object is configured as well. For example, the size of the tip for a blue-tipped marker is used as part of the configuration. The size can be determined by holding the blue tip of the marker a fixed distance from the user and/or video camera. In various embodiments, different marking objects are configured, and each has a different set of configuration parameters. For example, no two marking objects share the same color. In some embodiments, marking objects can share the same color as long as other properties are different, such as the size and/or shape of the object. In various embodiments, the marking objects can be configured by a unique color scheme or pattern instead of by a single color and threshold range. For example, in some embodiments, a red and white striped pattern can be used to configure a marking object.

As part of the marking object configuration, a whiteboard action property is configured for each marking object. For example, a first marking object can be configured for drawing actions, a second marking object can be configured for erasing actions, and a third marking object can be configured for highlighting actions. Other whiteboard actions can be configured as properties and assigned to marking objects as well, such as mode change actions which can start and stop the recognition of certain whiteboard actions such as drawing and erasing. In some embodiments, mode objects or indicator objects are configured as a type of marking object.

At 705, a whiteboard action start indicator is received. For example, a gesture is recognized that indicates that whiteboard actions such as drawing and erasing actions should be recognized. In some embodiments, the whiteboard action start indicator corresponds to showing the video camera an indicator marking object. For example, in some embodiments, anytime a drawing marking object is captured by the video feed, an implicit start indicator is received and drawing gestures will be captured. Alternatively, in some embodiments, the whiteboard is explicitly toggled between recognizing and ignoring certain actions. To enable the whiteboard to recognize certain actions, an explicit start indictor must first be received. For example, in some embodiments, a start indicator gesture is used to activate recognition of whiteboard actions that modify the contents of the whiteboard, such as drawing, erasing, and highlighting, among others. The start indictor can correspond to a gesture such as holding up a single finger or making a twisting hand gesture mimicking turning a rotational dial from the off position to the on position. In some embodiments, the start indicator is a gesture performed to modify a virtual user interface, such as a virtual user interface displayed on the user's screen or monitor on top of or alongside the virtual shared whiteboard. For example, a user can gesture to slide a virtual slider displayed in a menu bar above the virtual whiteboard from a stop position to a start position. In some embodiments, the start indicator corresponds to a start gesture when utilizing a mode or an indicator object. A mode or indicator object can be a marking object configured for performing mode changes or start indicators. For example, a mode marking object can be used to switch between different whiteboard modes by performing different gestures using the mode marking object.

In some embodiments, the start indicator is an implicit indicator that is received as long as a stop indictor is not present in the video feed. For example, as long as a user does not show a stop indicator, the start indicator can be received. In the event a user shows both a stop indicator and a drawing marking object, gestures performed by the drawing marking object are ignored and no start indicator is received. However, once the stop indicator is removed, the presence of the drawing marking object is an implicit start indicator.

At 707, user gestures are identified. For example, user gestures are identified from the video feed. In some embodiments, the gestures are performed over time and require capturing multiple frames of the video. In various embodiments, the gestures are identified at least in part by recognizing the marking object. The identified gestures can correspond to different whiteboard actions such as drawing a drawing feature on the whiteboard or erasing a portion of the whiteboard. In some embodiments, the gestures can correspond to saving the contents of the whiteboard, selecting a portion of the whiteboard, duplicating a selected portion, or another appropriate whiteboard action. In some embodiments, the process of FIG. 4 is performed at 707 to capture a user gesture, translate the gesture into a whiteboard action, and update the whiteboard using the translated action.

At 709, a whiteboard action stop indicator is received. For example, a stop indicator gesture is received that corresponds to the start indicator received at 705. In various embodiments, the whiteboard action stop indicator stops certain gestures from being recognized and identified as whiteboard actions. For example, a stop indicator can stop the capturing of gestures/actions that modify the contents of the whiteboard such as drawing and erasing. In various embodiments, the techniques for identifying a stop indicator are similar to the ones for identifying a start indicator at 705. For example, a stop indicator gesture can correspond to a unique hand gesture such as holding up an open palm or a first to indicate a stopping signal. In some embodiments, a stop action indicator corresponds to a stop gesture performed while using a marking object such as a mode object for mode changes or an indicator object for performing stop indicators. In some embodiments, a user can manipulate a virtual user interface to activate a stop indicator. In various embodiments, a stop indicator can override other gestures from being recognized. For example, a stop indicator can prevent a user's drawing marking object from making a drawing feature (such as a line) on the whiteboard. The stop indicator can be used to virtually pick up a virtual whiteboard marker and move it to a new position on the virtual whiteboard.

Figure 8:
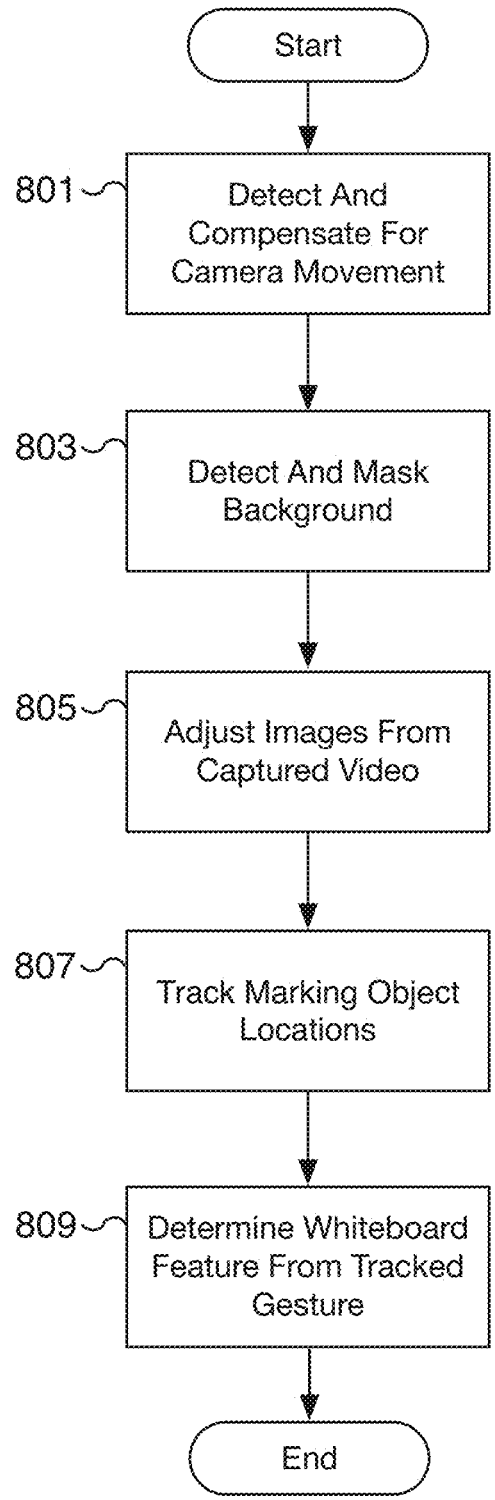
FIG. 8 is a flow chart illustrating an embodiment of a process for identifying a gesture for a virtual shared whiteboard.

FIG. 8 is a flow chart illustrating an embodiment of a process for identifying a gesture for a virtual shared whiteboard. For example, a user performs a gesture captured by a video camera during a video meeting. Using the process of FIG. 8, the gesture is recognized as a whiteboard action that can be applied to a virtual whiteboard and shared with other users of the video meeting. In some embodiments, the user may be holding a marking object to perform a particular whiteboard action when gesturing. In some embodiments, the process of FIG. 8 is performed at least in part at 305 of FIG. 3 for updating a whiteboard drawing and/or at 707 of FIG. 7 for identifying gestures. In some embodiments, the process of FIG. 8 is performed repeatedly, such as in a loop, as long as a user has access to modify a shared whiteboard. In various embodiments, the users of the meeting correspond to any pair or grouping of clients 101, 103, 105, and 107 of FIG. 1. In some embodiments, the video meeting can be hosted via a cloud service that is offered by cloud service server 111 of FIG. 1.

At 801, camera movement is detected and compensated for. For example, camera movement along any axis is detected and tracked. The camera movement and its timing are used to differentiate the movement of the camera from the movement of the objects captured by the camera's video feed. In various embodiments, both translation and rotation of the camera are detected and used to compensate for the movement of the camera when determining the movement to attribute to the user and the user's gestures.

At 803, a background is detected and masked. For example, a background is detected and masked to identify the user and the user's gestures. In some embodiments, the background is detected by determining the background at certain time intervals and comparing the different frames of the video and how they change over time. In some embodiments, the user can configure a background to determine an initial background image. In various embodiments, the background is masked from the video feed to isolate the user and/or the marking object used by the user.

At 805, images from captured video are adjusted. For example, images captured by a video camera after adjusting for camera movement and background masking are adjusted to improve the analysis results. For example, the images can be adjusted to remove noise. In some embodiments, the images are adjusted to optimize lighting conditions. In some embodiments, one or more image adjustment steps can also be performed before steps 801 and/or 803. By performing one or more image processing steps, the images can be optimized for identifying the user and/or the marking object used by the user. In some embodiments, the adjustment is based on the identified colors of the configured marking objects and their corresponding value ranges. The adjustment can highlight the detection of the identified colors.

At 807, the locations of a marking object are tracked. For example, the adjusted images are analyzed to identify marking objects. The marking objects can be identified by their configured colors, color values, sizes, and/or shapes. Once identified within the adjusted images, the locations of the one or more marking objects are tracked. For example, a user can perform a curved gesture using a blue-tipped marker as a marking object. The gesture made with the marking object is captured and the locations along the curve are tracked. Each point of the curve is mapped to a point on the virtual whiteboard.

At 809, a whiteboard feature is determined from the tracked gesture. For example, by tracking the location of the gesture, a whiteboard feature, such as a drawing feature or an erasing feature representing an area to erase, is determined. In some embodiments, the tracked locations form a line (or a curve) that is intended to be drawn on the whiteboard. The line (or curve) is then translated to a drawing feature that is used to update the whiteboard's contents with a drawn line (or curve). In some embodiments, the tracked locations form a line that represents a line made by an eraser to erase portions of the whiteboard's contents. The line is then translated to an erasing feature that is used to update the whiteboard's contents by erasing areas that overlap with the tracked locations of the eraser line. Other whiteboard features can be determined as well, such as features corresponding to drawn dotted lines, drawn shapes, highlighted lines, and highlighted shapes, among others. In some embodiments, when a whiteboard feature is determined from the tracked gesture, the feature and gesture can be mirrored to adjust for differences between the user and camera's perspective. The mirroring allows the whiteboard to reflect the view of the user performing the gestures, which can be a different perspective than the user's video camera.

Figure 9:
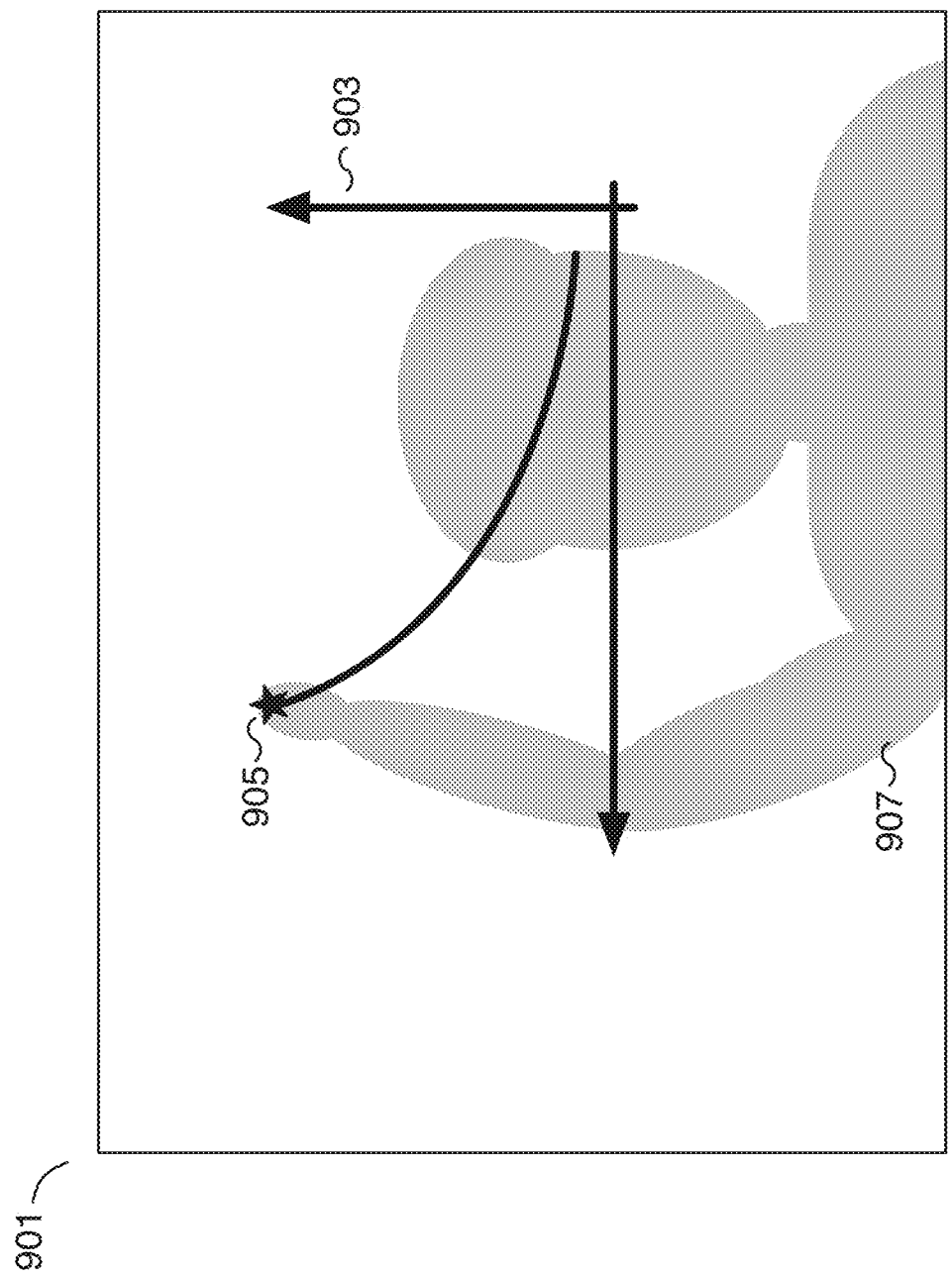
FIG. 9 is a diagram illustrating an embodiment of a captured video image overlayed with captured whiteboard drawing features.

FIG. 9 is a diagram illustrating an embodiment of a captured video image overlayed with captured whiteboard drawing features. In the example shown, diagram 901 includes whiteboard drawing features 903 and identified marking object 905 overlaid on captured video image 907. Whiteboard drawing features 903 corresponds to a graph with a curve decreasing from left to right and is captured from the point of view of a video camera facing the user. Identified marking object 905 is shown as a star and corresponds to the marking object used by the user to create whiteboard drawing features 903. Captured video image 907 is extracted from a video camera feed associated with a video meeting and includes an image of the user, represented as a silhouette, completing the gestures resulting in whiteboard drawing features 903. Whiteboard drawing features 903 corresponds to drawing whiteboard actions that have been captured and translated to drawing features using one or more of the processes of FIGS. 3-8. In various embodiments, the users of the video meeting correspond to any pair or grouping of clients 101, 103, 105, and 107 of FIG. 1 and the user shown in diagram 901 is any one of the users in the video meeting. In some embodiments, the video meeting can be hosted via a cloud service that is offered by cloud service server 111 of FIG. 1.

In the example shown, the user draws on the virtual whiteboard by using a drawing marking object represented as identified marking object 905 and performing drawing gestures. In various embodiments, the gestures are directed towards a 2-dimensional plane between the user and the video camera. Captured whiteboard drawing features 903 is displayed over the user's head since the corresponding gestures were performed at approximately eye level. In various embodiments, the relative locations associated with the tracked gestures and their relationship to the whiteboard can be configured. For example, a user can configure the upper right and lower left corners of the drawing surface for the virtual whiteboard by defining a rectangle that exists in a 2-dimensional plane between the user and the video camera. In some embodiments, the user also configures the distance between the user and the defined 2-dimensional plane that represents the virtual drawing surface. In the example shown, the displayed drawing features are captured from the perspective of a video camera facing the user. As a result, whiteboard drawing features 903 is a mirror image of the intended graph drawn by the user. In various embodiments, whiteboard drawing features 903 is mirrored before the whiteboard is updated and shared with users. This allows the users of the video meeting and virtual shared whiteboard to view the whiteboard contents from a user's perspective and not from the point of view of the video camera.

Figure 10:
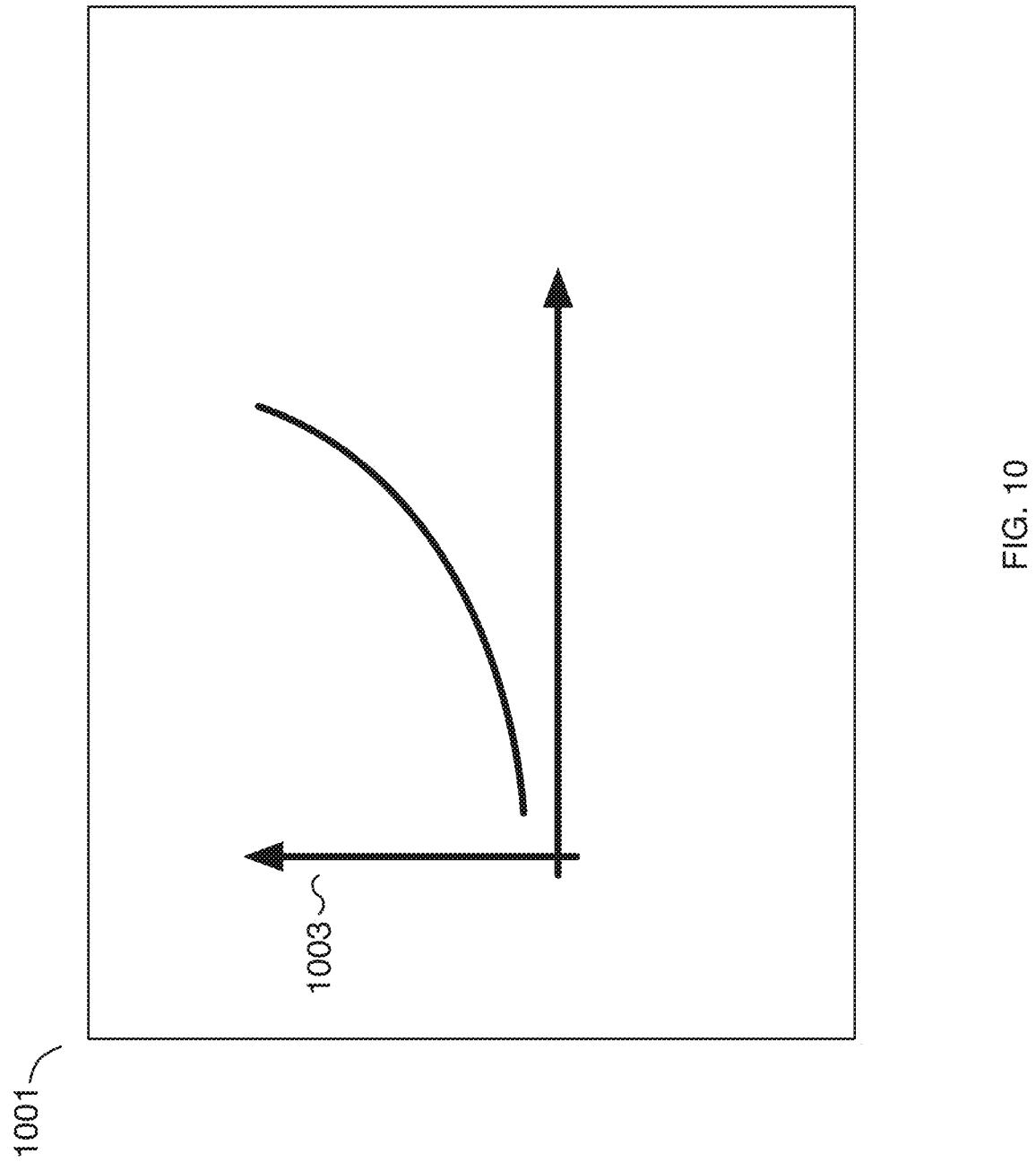
FIG. 10 is a diagram illustrating an embodiment of a virtual shared whiteboard.

FIG. 10 is a diagram illustrating an embodiment of a virtual shared whiteboard. In the example shown, diagram 1001 shows the drawing contents of a virtual shared whiteboard that includes whiteboard drawing features 1003. Diagram 1001 corresponds to the whiteboard actions and the captured whiteboard drawing features from FIG. 9 as shared with users of the virtual shared whiteboard. Unlike FIG. 9, in diagram 1001, whiteboard drawing features 1003 has been mirrored such that the whiteboard drawing is shown from the user's perspective and not the point of view of a user's video camera. Also, unlike FIG. 9, in diagram 1001, the captured video image that includes the user's image has been masked and only the whiteboard is shown. In various embodiments, diagram 1001 corresponds to mirrored drawing whiteboard actions that have been translated to drawing features using one or more of the disclosed processes of FIGS. 3-8. In the example shown, whiteboard drawing features 1003 corresponds to a graph with a curve increasing from left to right, mirroring whiteboard drawing features 9003 of FIG. 9.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a video capturing a user facing a camera;
   analyzing an image of the video to identify a marking object in the image with a color value within a first range, wherein the marking object is held by the user in between the user and the camera;
   detecting a drawing gesture performed by the user using the marking object in a space between the user and the camera;
   marking a location associated with the marking object; and
   providing the marked location to one or more other users via a collaboration medium.

2. The method of claim 1, comprising:
   mirroring the marked location prior to providing the marked location to the one or more other users via the collaboration medium.

3. The method of claim 1, further comprising:
   analyzing the image of the video to identify a start indicator gesture prior to identifying the marking object in the image.

4. The method of claim 3, wherein analyzing the image of the video to identify the start indicator gesture prior includes identifying an indicator object that is different from the marking object.

5. The method of claim 1, further comprising:
   analyzing the image of the video to identify a stop indicator gesture.

6. The method of claim 5, wherein the stop indictor gesture corresponds to a first gesture or an open palm gesture.

7. The method of claim 1, wherein marking the location associated with the marking object includes:
   detecting movement of a camera capturing the video of the user; and
   adjusting the image of the video based on the detected movement of the camera.

8. The method of claim 1, wherein marking the location associated with the marking object includes:
   detecting a background of the image of the video; and
   adjusting the image of the video by masking the background of the image of the video.

9. The method of claim 1, wherein marking the location associated with the marking object includes removing noise in the image of the video or optimized lighting conditions of the image of the video.

10. The method of claim 1, wherein providing the marked location to the one or more other users via the collaboration medium includes:
   creating an update to reflect the marked location; and
   transmitting the update to a cloud service provider, wherein the cloud service provider is configured to distribute the update to the one or more other users and create a collaboration record based on the update.

11. The method of claim 1, wherein providing the marked location to the one or more other users via the collaboration medium includes determining an edit state of a virtual shared whiteboard, and wherein the edit state of the virtual shared whiteboard includes at least a start state and a pause state.

12. The method of claim 1, wherein a property of the marking object is determined by identifying the color value associated with the marking object.

13. The method of claim 1, wherein a property of the marking object is determined by identifying one or more whiteboard actions associated with the marking object, wherein the one or more whiteboard actions include a drawing action, an erasing action, a highlighting action, or a selection action.

14. The method of claim 1, wherein a property of the marking object is determined by identifying a size or shape associated with the marking object.

15. The method of claim 1, wherein the marked location is associated with a drawing, erasing, highlighting, copying, pasting, duplicating, zooming, panning, or cropping action.

16. A system, comprising:
   one or more processors;
   a video camera; and
   a memory coupled to the one or more processors, wherein the memory is configured to provide the one or more processors with instructions which when executed cause the one or more processors to:
      receive a video capturing a user facing the video camera;
      analyze an image of the video to identify a marking object in the image with a color value within a first range, wherein the marking object is held by the user in between the user and the video camera;
      detect a drawing gesture performed by the user using the marking object in a space between the user and the video camera;
      mark a location associated with the marking object; and
      provide the marked location to one or more other users via a collaboration medium.

17. The system of claim 16, wherein a property of the marking object is determined by identifying the color value associated with the marking object.

18. The system of claim 16, wherein a property of the marking object is determined by identifying one or more whiteboard actions associated with the marking object, wherein the one or more whiteboard actions include a drawing action, an erasing action, a highlighting action, or a selection action.

19. The system of claim 16, wherein a property of the marking object is determined by identifying a size or shape associated with the marking object.

20. A computer program product, the computer program product being embodied in a non-transitory computer readable storage medium and comprising computer instructions for:
   receiving a video capturing a user facing a camera;
   analyzing an image of the video to identify a marking object in the image with a color value within a first range, wherein the marking object is held by the user in between the user and the camera;
   detecting a drawing gesture performed by the user using the marking object in a space between the user and the camera;
   marking a location associated with the marking object; and
   providing the marked location to one or more other users via a collaboration medium.

* * * * *

UNITED STATES PATENT AND TRADEMARK OFFICE
CERTIFICATE OF CORRECTION

| | | |
|---|---|---|
| PATENT NO. | : 11,245,871 B1 | |
| APPLICATION NO. | : 17/140984 | |
| DATED | : February 8, 2022 | |
| INVENTOR(S) | : Bhairavi Gandhi et al. | |

It is certified that error appears in the above-identified patent and that said Letters Patent is hereby corrected as shown below:

In the Specification

In Column 5, Line(s) 27, delete "al so" and insert --also--, therefor.

In Column 9, Line(s) 8, delete "first" and insert --fist--, therefor.

In Column 9, Line(s) 26, delete "first" and insert --fist--, therefor.

In the Claims

In Column 16, Line(s) 66, Claim 6, delete "first" and insert --fist--, therefor.

Signed and Sealed this
Thirteenth Day of December, 2022

*Katherine Kelly Vidal*

Katherine Kelly Vidal
*Director of the United States Patent and Trademark Office*